Jan. 28, 1969  H. LIST ET AL  3,424,930
PIEZOELECTRIC PRESSURE TRANSDUCER
AND PROCESS FOR ITS MANUFACTURE
Filed June 15, 1966  Sheet 1 of 3
FIG. 1
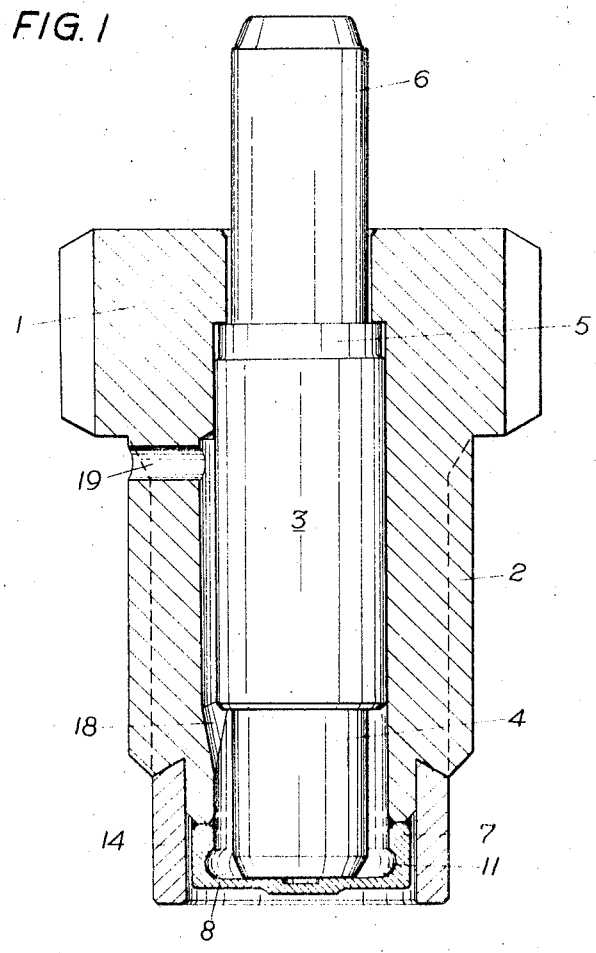
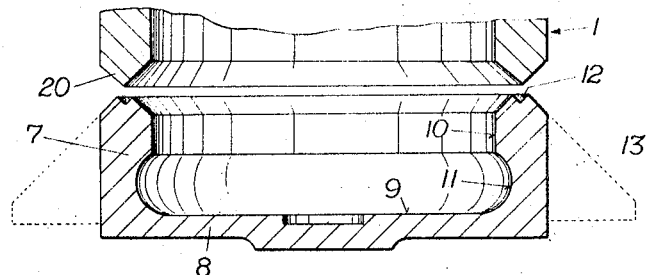
FIG. 3
Inventors
Hans List
Rudolf Zeiringer
Rudolf Hatschek
By Watson, Cole, Grindle + Watson
Attys.

Jan. 28, 1969  H. LIST ET AL  3,424,930
PIEZOELECTRIC PRESSURE TRANSDUCER
AND PROCESS FOR ITS MANUFACTURE
Filed June 15, 1966
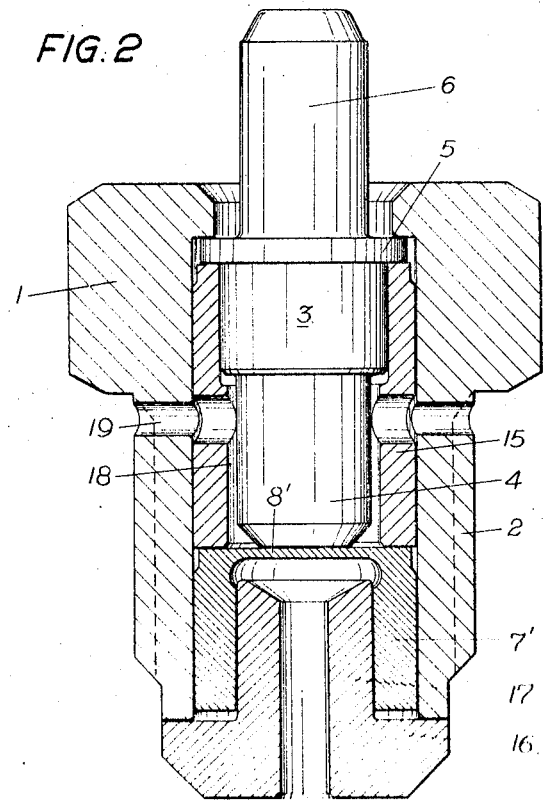
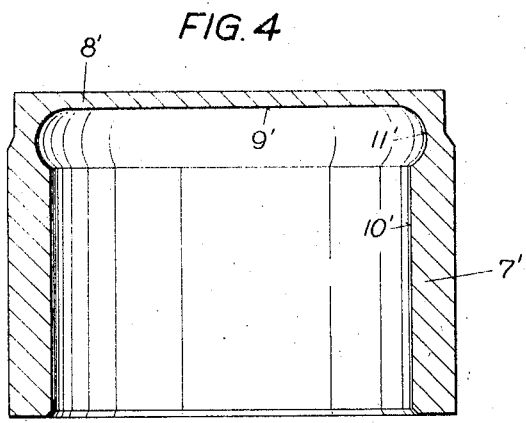
Inventors
Hans List
Rudolf Zeiringer
Rudolf Hatschek
By Watson, Cole, Grindle & Watson
Attys.

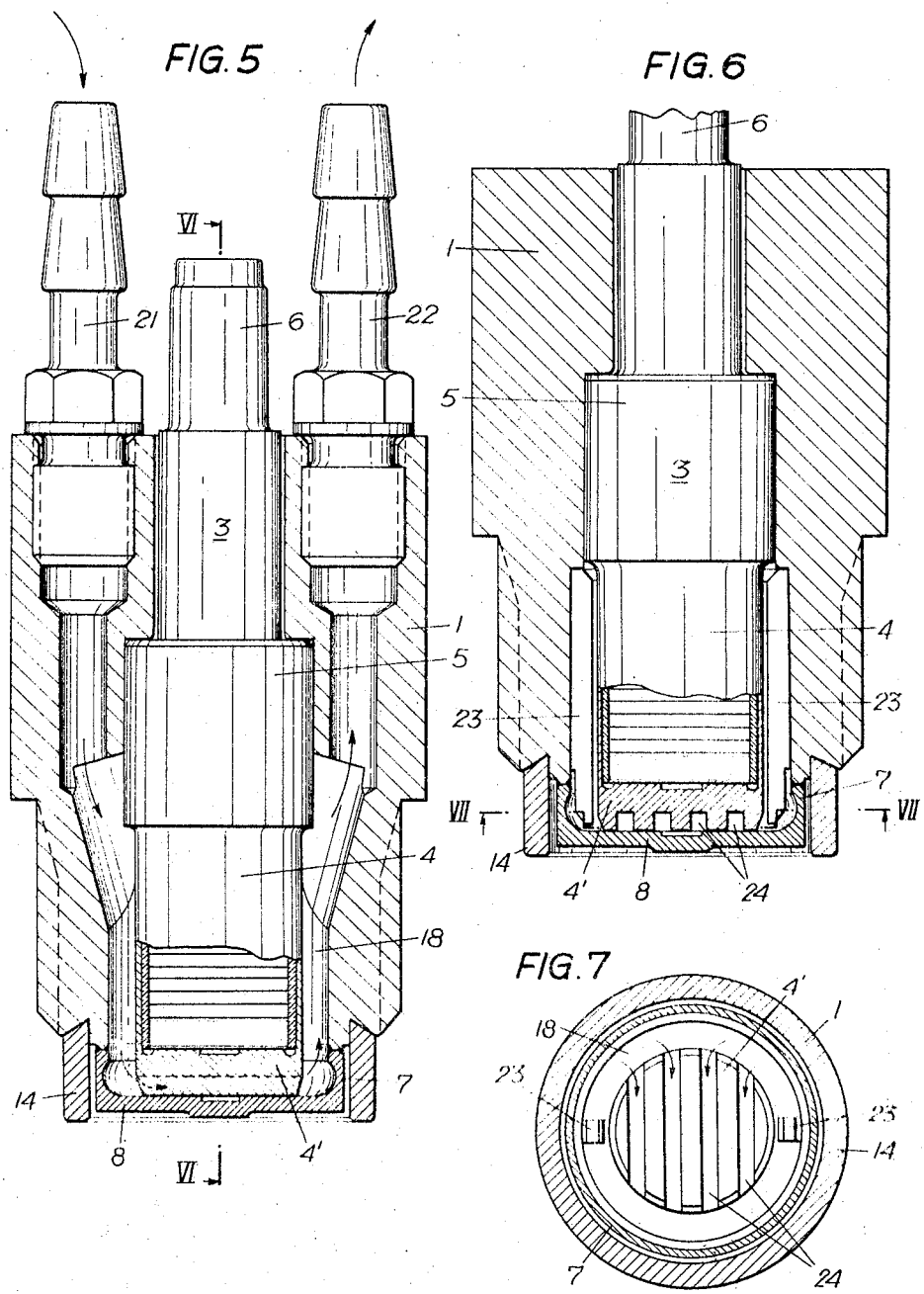

United States Patent Office 3,424,930
Patented Jan. 28, 1969

3,424,930
PIEZOELECTRIC PRESSURE TRANSDUCER AND PROCESS FOR ITS MANUFACTURE
Hans List, 126 Heinrichstrasse, Graz, Austria; Rudolf Zeiringer, Graz, Austria; and Rudolf Hatschek, Fribourg, Switzerland; said Zeiringer and said Hatschek assignors to said List
Filed June 15, 1966, Ser. No. 557,828
Claims priority, application Austria, June 22, 1965, A 5,669/65; July 20, 1965, A 6,664/65
U.S. Cl. 310—8.7    5 Claims
Int. Cl. H02n 11/00

ABSTRACT OF THE DISCLOSURE

A piezoelectric pressure transducer in which a prestressing sleeve is mounted in a transducer housing which latter, also encloses a piezoelectric element and an essentially cylindrical shell with a thin-walled bottom integral therewith and forming a membrane with the inner surface adjoining the lower front end of the prestressing sleeve and the outer surface is exposed to the pressure of the pressure-measuring point.

---

The invention relates to a piezoelectric pressure transducer comprising a piezoelectric element enclosed by a prestressing sleeve within the transducer housing and a membrane subject to the pressure to be measured, the said membrane adjoining the prestressing sleeve and sealing the interior of the transducer housing off against the pressure measuring point.

In a conventional type of pressure transducer a disk-shaped membrane defines the closing front end of the pressure transducer facing the measuring point. The membrane is welded both to the annular front end rim of the transducer housing and to the bottom of the prestressing sleeve serving as a pressure foot. In the area of the annular gap between the transducer housing and the prestressing sleeve the membrane is provided with a reentrant annular bead. Moreover, this type of pressure transducer is not only difficult to manufacture but presents also certain functional drawbacks. For example, it is extremely difficult to achieve absolutely tight welding seams on the membrane of small-sized and miniature water-cooled pressure transducers of the kind used for pressure measurements in cylinders of internal combustion engines. Besides, the membrane will have to be of greater thickness than would be suitable for its use as a sealing and pressure-transmitting element. The resulting lesser elasticity of the membrane has, however, an adverse effect upon the characteristic curve of the pressure transducer. In fact, the general trend is towards ever greater linearity of the characteristic curve of pressure transducers, which is, however, lost if the membrane lacks flexibility. Furthermore, the result of the measurements is adversely affected by the fact that the membrane is subject to internal stresses due to the welding process. Consequently, the conventional design is hardly suitable for economic serial production for which uniformity of properties and characteristics of the product is essential. Another shortcoming of conventional pressure transducers resides in the unprotected arrangement of the membrane which is thus exposed to the risk of damage.

According to another conventional design, an annular membrane is provided to bridge across the annular gap between the transducer housing and the pressure foot. With this arrangement, it is frequently very difficult to seal the interior of the housing off against the measuring point. However, positive sealing is essential for the effective protection of the piezoelectric element against the penetration of moisture, combustion gases and the like. Moreover, with pressure transducers comprising annular membranes there is the ever-present risk of inadvertently warping and deforming the membrane during its installation.

It is the purpose of the invention to improve upon piezoelectric pressure transducers of conventional design with a view to facilitating both the manufacture and operation of these devices. According to the invention, this is achieved by providing an additional, preferably cylindrical shell comprising a thin-walled bottom cast integral with the shell and constituting the membrane, the said bottom adjoining the lower front end of the prestressing sleeve, the inner surface of the membrane terminating in the shell with a recess in the inner wall. This design provides the membrane with a circumferential reinforcement protecting it against warping and deformation during the assembly. The shell wall of considerable thickness as compared with the membrane is quite capable of largely absorbing such assembling and welding stresses as may occur during the insertion of the shell by pressing or welding and are liable to adversely affect the membrane. In addition, the shell provides a means for accurately adjusting the overall prestress of the piezoelectric element, since the overall stress results from additive overlapping of the initial prestress of the piezoelectric element by the prestressing sleeve and from the pressure exerted upon the prestressing sleeve by the membrane flexibly applied thereto. Flexible application of the membrane to the prestressing sleeve is necessary in order to prevent the membrane from being lifted off the prestressing sleeve during measurements of negative pressures which is likely to produce faulty results of the measurements. Since this portion of the overall prestress of the piezoelectric element can be altered and adjusted as required by means of appropriate tolerances in sleeve size and by other methods as herebelow described in greater detail, it will be quite easy to obtain the required overall prestress during the serial production of pressure transducers. Moreover, the design according to the invention greatly facilitates the assembling of the pressure transducer and minimizes the risk of damaging the membrane during its installation by pressing or welding. Furthermore, the membrane can be arranged in a protected location within the transducer housing, such as according to a design wherein the wall of the shell is facing the measuring point.

With a beaded membrane the effective membrane surface available for the transfer of pressure from the measuring point to the transducer element is furthermore greatly increased, all the other dimensions being equal, which affords an advantageous increase of the sensitivity of the pressure transducer. Moreover, this design ensures a long life of the membrane whose endurance is enhanced as a result of the bead.

According to another feature of the invention the life of this membrane can be further extended to a considerable extent by providing the bead with a glossy surface finish, thereby eliminating objectionable notch effects which may be due to even minor rough spots of the surface, such as furrows and the like produced by machining the bead area. Experience goes to show that such a membrane will withstand many times the number of load alterations formerly attainable with conventional membranes.

When applying the invention to welded pressure transducers, a process of manufacture according to the invention consists in providing the shell with a supporting flange defining its rim, the said supporting flange being produced with an annular groove, the transducer housing being provided with a raised centering shoulder mating the annular groove at the rim opposite the measuring point, whereupon the shell is placed with the annular groove upon the centering shoulder of the transducer housing and welded together with the transducer housing between the electrodes of a resistance-welding apparatus, the prestress of the piezoelectric element being measured and the welding operation terminated as soon as a predetermined amount of prestress has been attained, whereupon the shell is finished to size by appropriately turning the supporting flange. This process offers a variety of advantages for the serial production of pressure transducers. For example, it enables the manufacturer to dispense with special centering devices such as spacers and the like for the assembly of the pressure transducer and the welding operation is also greatly simplified. Since due to the relatively small transitional cross section in the area of the centering shoulder it is possible to attain a high current density in the weld area, a faultless welding seam is obtained. On the other hand, the membrane itself is only moderately heated during the welding operation, which precludes the risk of deformation due to thermal stresses almost positively. The elasticity of the membrane is not impaired by the welding process, since the weld is not located on the membrane proper but on the rim of the shell. Permanent control of the prestress of the piezoelectric element during the welding operation, preferably by electronic means involving direct load measurements and the automatic termination of the welding process ensure the maintenance of predetermined prestress values and approximately identical characteristic curves in connection with the serial production of pressure transducers.

According to the conventional design of liquid-cooled piezoelectric pressure transducers of the type hereabove described, an annular chamber is provided between the transducer housing and the prestressing sleeve, and divided into two sections by means of two diametrically opposite and axially extending beads of a guide shell inserted in the said annular chamber, one of the annular chamber sections communicating with the coolant delivery pipe and the other with the coolant discharge pipe. In that case, the membrane is formed by an annular disk, the bottom portion of the prestressing sleeve extending through the membrane in its center. In the interior of the housing closed by the membrane, the bottom portion of the prestressing sleeve is provided with through bores extending in perpendicular relation to the transducer axis, interconnecting both sections of the annular chamber, thus permitting the flow of the coolant from one section of the annular chamber to the other via the bottom portion of the prestressing sleeve to be cooled. The drawback inherent in this design is the comparatively large mass of the prestressing sleeve reducing its characteristic frequency to an objectionable extent. In addition, double sealing of the annular membrane is difficult.

According to a further feature of the invention it is possible to assure appropriate cooling for the bottom portion of the prestressing sleeve as necessary for a high degree of independence from temperature of a transducer of the above-mentioned type, by providing in a manner known per se an annular chamber between the transducer housing and the prestressing sleeve, the said chamber being divided by means of two diametrically opposite and approximately axial bars or the like closing elements into two annular chamber sections of equal size, one of these sections communicating with the delivery pipe and the other with the discharge pipe for the coolant. The bottom portion of the prestressing sleeve adjoining the membrane presents ducts which are open in the direction of the membrane, and interconnect the two annular chamber sections. This not only ensures extremely effective cooling and simplicity of manufacture, but it is also possible for the mass of the prestressing sleeve to be reduced to the minimum due to the absence of through bores, thereby increasing the inherent frequency in such a way as to eliminate its objectionable influence upon the result of the measurements.

Further details of the invention will appear from the following description of several embodiments of the invention with reference to the accompanying drawing in which:

FIG. 1 shows a welded pressure transducer according to the invention,

FIG. 2 a different type of pressure transducer according to the invention, both figures presenting axial cross sectional views.

FIG. 3 illustrates a detail of the pressure transducer as shown in FIG. 1, and

FIG. 4 a detail of the pressure transducer shown in FIG. 2, the two latter figures presenting cross sectional views on an enlarged scale.

FIG. 5 is a cross sectional view of another type of piezoelectric pressure transducer according to the invention, FIG. 6 a partial cross sectional view on line VI—VI of FIG. 5, and FIG. 7 a cross sectional view on line VII—VII of FIG. 6.

In each case, the transducer element 3 is arranged in the middle of the transducer housing 1, the cylindrical stem 2 of which is externally screw-threaded for screwing the pressure transducer into a receiving bore. The transducer element 3 comprises the piezoelectric element such as laminated quartzes with their associated electrodes arranged within a prestressing sleeve 4, designed as a tube spring for example, for the purpose of eliminating the elastic cleavage strains occurring at the contact surfaces between the laminated quartz and the electrodes, however smooth the polish of the laminated quartzes may be, thus ensuring an approximately linear characteristic curve of the piezoelectric element. On the side of the housing 1 facing away from the measuring point the transducer element 3 terminates in a connecting piece 6.

With welded pressure transducers as shown in FIG. 1 the front end of the transducer housing 1 facing the measuring point is closed by means of a butt-welded and essentially cylindrical shell 7, the thin-walled bottom 8 of which forms a membrane elastically adjoining the front end of the prestressing sleeve 4.

The flat inner surface 9 of this membrane terminates in a bead 11 mating a recess inside the shell 7. In order to eliminate even extremely fine notches liable to cause the premature destruction of the membrane, the surface of the bead 11 is provided with a mirror finish. The shell 7 is surrounded by a thrust collar 14 pressed on to the side of the transducer housing 1 facing the measuring point. The thrust collar 14 rests with its front end tightly in the receiving bore of the measuring point. With the pressure transducer removed it protects the membrane against damage.

The pressure transducer as shown in FIGS. 2 and 4, wherein the cylindrical shell is designated by reference number 7' and corresponding elements of the first-mentioned embodiment of the invention by the same reference numbers, namely 8' through 11' respectively, differs from the design illustrated in FIGS. 1 and 3 mainly in the arrangement of the shell 7 in the transducer housing and in its attachment thereto. The transducer element 3 is located within the transducer housing 1 in a hollow cylindrical insert 15, one annular face of which adjoins the shoulder 5 of the transducer element 3. The other annular face of the insert 15 facing the measuring point is located in the same plane as the front end of the prestressing shell 4. The shell 7' is inserted in the transducer housing 1 with its aperture facing the measuring point, its bottom 8' adjoining the prestressing sleeve 4 and the annular front end of the insert 15. An axially perforated mushroom cap 16 is pressed with its cylindrical stem 17 into the aperture of the shell 7'. The cap 16 rests with its shoulder on the annular front end surface of the transducer housing 1, thereby fixing the position of the shell 7' in the housing 1. With this embodiment of the invention the membrane is impinged upon through the axial bore of the cap 16.

With both embodiments of the invention coolant chambers 18 are provided within the transducer housing 1 around the prestressing sleeve 4, the coolant being delivered to the said chambers of the pressure transducers illustrated in FIGS. 1 through 4 via appropriate connecting bores 19.

According to the invention, the manufacturing process as described hereafter is preferably used for the welded type of pressure transducers as illustrated in FIGS. 1 and 3. Before the assembly, the shell 7 presents at its rim an annular groove 12, and the transducer housing 1 a centering shoulder 20 mating the said annular groove 12 at the rim facing the measuring point (FIG. 3). Moreover, as indicated by broken lines, the shell 7 is provided with a supporting flange 13 on its periphery. The shell 7 is placed with its annular groove 12 on the centering shoulder 20 of the transducer housing 1.

Both elements are now placed between the electrodes of a resistance-welding apparatus, the shell 7 resting with its supporting flange 13 and the transducer housing 1 with its outer front surface on one of the electrodes each. During the following welding operation the electrodes exert an axial pressure upon the elements to be welded together. The heat concentrates upon the area of the centering shoulder 20, because maximum current density prevails in this area due to the narrowing cross-section. As the welding operation proceeds, the bottom 8 of the shell 7 comes into contact with the front end of the prestressing sleeve 4 upon which it exerts an increasing axial pressure. The piezoelectric element enclosed in the prestressing sleeve 4 is thus additionally prestressed by the membrane, the overall prestress of the piezoelectric element being continously measured and the welding operation terminated as soon as a predetermined amount of prestress has been attained. This is preferably done by electronic means by measuring the charge of the piezoelectric element and by interrupting the power supply to the electrodes of the resistance-welding apparatus as soon as a value corresponding to the predetermined amount of prestress has been reached.

Upon completion of the welding operation the shell 7 is finished to size by appropriately turning the supporting flange 13.

With the type of pressure transducers illustrated in FIGS. 5 to 7, the lower portion of the transducer element 3, and in particular, the prestressing sleeve 4, is surrounded by an annular chamber 18 traversed by the coolant and for that purpose communicating with a delivery pipe 21 on the one hand, and with a discharge pipe 22 on the other hand. The annular chamber 18 is divided into two sections of equal size by means of diametrically opposite bars 23, one of which communicates with the said delivery pipe 21 and the other with the discharge pipe 22. The bars 23 extending as far as close to the prestressing sleeve 4 are preferably cemented or soldered into the trasnducer housing 1. In the bottom portion 4' of the prestressing sleeve 4 ducts 24, open in the direction of the membrane 8 are provided, establishing communication between the two sections of the annular chamber 18 formed by bars 23 and traversed by the coolant at comparatively great speed. This provides effective cooling for the bottom portion 4' of the prestressing sleeve 4 and the membrane 8, thereby ensuring a considerable degree of independence from temperature of the pressure transducer. Moreover, the open ducts 24 are easy to manufacture and require only minor thickness of the bottom portion 4' of the prestressing sleeve 4, so that the masses may be small and consequently, the inherent frequency of the pressure transducer high. Since the membrane 8 adjoins the bottom portion 4' of the prestressing sleeve 4 continuously with a certain amount of prestress, permanent closure of the ducts 24 in the direction of the transducer axis by means of the membrane 8 is assured.

We claim:
1. A piezoelectric pressure trasnducer comprising a transducer housing, a prestressing sleeve within the said transducer housing enclosing a piezoelectric element, an essentially cylindrical shell having a thin-walled bottom integral with the said shell and forming a membrane, the inner surface of which adjoins the lower front end of the said prestressing sleeve, the outer surface being exposed to the pressure of the pressure-measuring point, the said shell being tightly connected with the said transducer housing, and the said shell having a rounded circumferential groove on the inside forming a recess between the inner surface of the said membrane and the said shell.

2. A piezoelectric pressure transducer according to claim 1, wherein the said rounded circumferential groove presents a mirror-finished surface.

3. A piezoelectric pressure transducer according to claim 1, wherein the rim of the shell is connected with the transducer housing by welding.

4. A piezoelectric pressure transducer according to claim 3, wherein the transducer housing presents a centering shoulder welded together with the said rim of the shell.

5. A piezoelectric pressure transducer as claimed in claim 1, comprising an annular chamber extending between the said transducer housing and the said prestressing sleeve, two diametrically opposite bars between the said annular chamber, approximately extending in an axial direction and dividing the said annular chamber into two sections of equal size, a delivery pipe for a coolant terminating in one of the two sections, a discharge pipe for the coolant terminating in the other section, the said prestressing sleeve having ducts in its bottom portion adjoining the said membrane, the said ducts being open in the direction of the membrane and establishing intercommunication between the two sections of the said annular chamber.

References Cited

UNITED STATES PATENTS

| 2,917,642 | 12/1959 | Wright | 310—9.1 |
| 3,082,334 | 3/1963 | Riesen | 310—9.1 |
| 3,150,274 | 9/1964 | Pischinger | 310—8.7 |
| 3,158,763 | 11/1964 | Busch | 310—8.7 |
| 3,171,989 | 3/1965 | Hatschek | 310—8.7 |
| 3,313,962 | 4/1967 | Sonderegger | 310—9.2 |
| 3,349,259 | 10/1967 | Kistler | 310—8.7 |

J. D. MILLER, *Primary Examiner.*

U.S. Cl. X.R.
310—8.8, 9.1